(12) United States Patent
Kung (10) Patent No.: US 8,042,813 B2
(45) Date of Patent: Oct. 25, 2011

(54) SHAFT-SEALING DEVICE FOR PUMP (76) Inventor: Chang Cheng Kung, Kaohsiung County (TW)

( * ) Notice: Subject to any disclaimer, the term of this patent is extended or adjusted under 35 U.S.C. 154(b) by 550 days.

(21) Appl. No.: 12/268,495

(22) Filed: Nov. 11, 2008

(65) Prior Publication Data

US 2009/0295097 A1    Dec. 3, 2009

(30) Foreign Application Priority Data

Jun. 2, 2008    (TW) .............................. 97209682 U (51) Int. Cl.
*F16J 15/34*    (2006.01)
(52) U.S. Cl. .......................... 277/370; 277/371; 277/408
(58) Field of Classification Search .................. 277/367, 277/369, 370, 371, 377, 379, 408
See application file for complete search history.

(56) References Cited

U.S. PATENT DOCUMENTS

| | | | |
|---|---|---|---|
| 5,529,315 A * | 6/1996 | Borrino et al. ................. | 277/352 |
| 6,428,011 B1 * | 8/2002 | Oskouei ......................... | 277/358 |
| 6,446,975 B1 * | 9/2002 | Bratthall ........................ | 277/366 |
| 6,685,192 B2 * | 2/2004 | Takigahira et al. ........... | 277/408 |
| 6,708,980 B2 * | 3/2004 | Takahashi ...................... | 277/380 |
| 7,014,192 B2 * | 3/2006 | Takahashi et al. ............. | 277/361 |
| 2003/0006561 A1 * | 1/2003 | Takahashi et al. ............. | 277/408 |
| 2009/0140494 A1 * | 6/2009 | Roddis ........................... | 277/408 |

FOREIGN PATENT DOCUMENTS

TW    300603    3/1997

* cited by examiner

*Primary Examiner* — Vishal Patel
(74) *Attorney, Agent, or Firm* — Alan Kamrath; Kamrath & Associates PA (57) ABSTRACT

A shaft-sealing device includes a seal cover (3) attached to a pump housing (2) in which a rotary shaft (1) is mounted. The seal cover (3) includes a shaft-sealing section (381) and a coolant outlet (326) intersecting the shaft-sealing section (381) at an opening (329). A fender (34) projects from a side (328) of a circumference of the opening (329) into the shaft-sealing section (381). The fender (34) has a side face (340) facing the opening (329) and guiding a coolant into the coolant outlet (326) through the opening (329) when the coolant fed into the shaft-sealing section (381) flows through the opening (329) and encounters the side face (340). A shaft sleeve (4) extends through the seal cover (3) and is mounted around the rotary shaft (1) to rotate therewith. A pumping ring (6) is mounted in the shaft-sealing section (381) and securely mounted around the shaft sleeve (4). A gap (341) is formed between the pumping ring (6) and the fender (34) in a radial direction perpendicular to an axis of the rotary shaft.

7 Claims, 7 Drawing Sheets

SHAFT-SEALING DEVICE FOR PUMP

BACKGROUND OF THE INVENTION

The present invention relates to a mechanical seal and, more particularly, to a shaft-sealing device for a pump.

It is usual to mount a mechanical seal in a pump for sealing between a pump housing of the pump and a rotary shaft. A typical mechanical seat generally includes a stationary ring secured in the pump housing and a rotary ring moveably mounted around the rotary shaft or a shaft sleeve and biased by springs toward the stationary ring to provide sealing engagement therebetween, thereby preventing a transported pump fluid in the pump housing from leaking from a relatively moveable interface between the stationary and rotary rings to the environment. In such a mechanical seal, the stationary and rotary rings will wear and generate considerable heat during relatively rotational operation at the sealing interface due to direct metal-to-metal contact therebetween. To reduce the wear and heat at the sealing interface, an additional cooling and/or lubricating device is often required.

Taiwanese Patent Publication No. 300603 discloses a shaft-sealing device including a stationary ring mounted around a rotary shaft and secured in a pump housing, and a rotary ring is moveably mounted around the rotary shaft to rotate therewith and biased toward the stationary ring to provide sealing engagement therebetween. A coolant pumped by an external source circulates in a shaft-sealing chamber in the pump housing through conduits connected to an inlet and an outlet in the pump housing to cool and/or lubricate the sealing surfaces. Further, the rotary ring is provided with a plurality of slots annularly spaced from one another in an outer circumference thereof to assist in stirring the coolant in the shaft-sealing chamber when rotating with the rotary shaft. However, the cooling effect of the coolant in the shaft-sealing chamber is not sufficient, as discharge of the coolant through the outlet is relatively slow, resulting in a poor heat exchange. Further, the rotary ring is generally made of wear-resisting carbide, and the outer circumference of the rotary ring provided with slots is disposed close to an inner wall of the pump housing for a greater stirring area. As a result, the rotary ring may contact the inner wall of the pump housing due to accidents such as shock, causing flare or electric potential difference and thus leading to hazards of breakdown.

Thus, a need exists for a mechanical seal that can improve the cooling effect of the coolant and assure safe operation while having a simplified structure.

BRIEF SUMMARY OF THE INVENTION

The present invention solves this need and other problems in the field of mechanical seal by providing, in a preferred form, a shaft-sealing device including a seal cover adapted to be attached to a pump housing in which a rotary shaft is mounted. The seal cover includes a shaft hole extending along an axis of the rotary shaft and including an enlarged shaft-sealing section having a diameter greater than that of the shaft hole. The seal cover further includes a coolant inlet through which a coolant is supplied into the shaft-sealing section and a coolant outlet extending from an outer periphery of the seal cover into the shaft-sealing section and intersecting the shaft-sealing section at an opening. The opening is delimited by a circumference having a first side and a second side downstream from the first side along a flowing direction of the coolant in the shaft-sealing section. A shaft sleeve extends through the shaft hole of the seal cover and is adapted to be mounted around the rotary shaft to rotate therewith. A stationary ring is mounted around the shaft sleeve and secured in the shaft-sealing section, and a rotary ring is moveably mounted around the shaft sleeve and biased toward the stationary ring to provide sealing engagement therebetween. A fender projects from the second side of the circumference delimiting the opening into the shaft-sealing section and is spaced from the shaft sleeve. The fender has a side face facing the opening and guiding the coolant into the coolant outlet through the opening when the coolant fed into the shaft-sealing section flows through the opening of the coolant outlet and encounters the side face of the fender.

In the most preferred form, the shaft-sealing device further includes a pumping ring mounted in the shaft-sealing section and securely mounted around the shaft sleeve to rotate therewith. The pumping ring is made of copper and includes an outer circumference having a plurality of protrusions annularly spaced from one another and extending along the axis to assist in stirring the coolant in the shaft-sealing section. A gap is formed between the pumping ring and the fender in a radial direction perpendicular to the axis.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

A shaft-sealing device of an embodiment according to the preferred teachings of the present invention is shown in the drawings and generally designated 10. According to the preferred form shown, shaft-sealing device 10 includes a seal cover 3 attached to a pump housing 2. A rotary shaft 1 is driven by a motor and extends from pump housing 2 through shaft-sealing device 10 to the environment (see FIG. 4).

Figure 4:
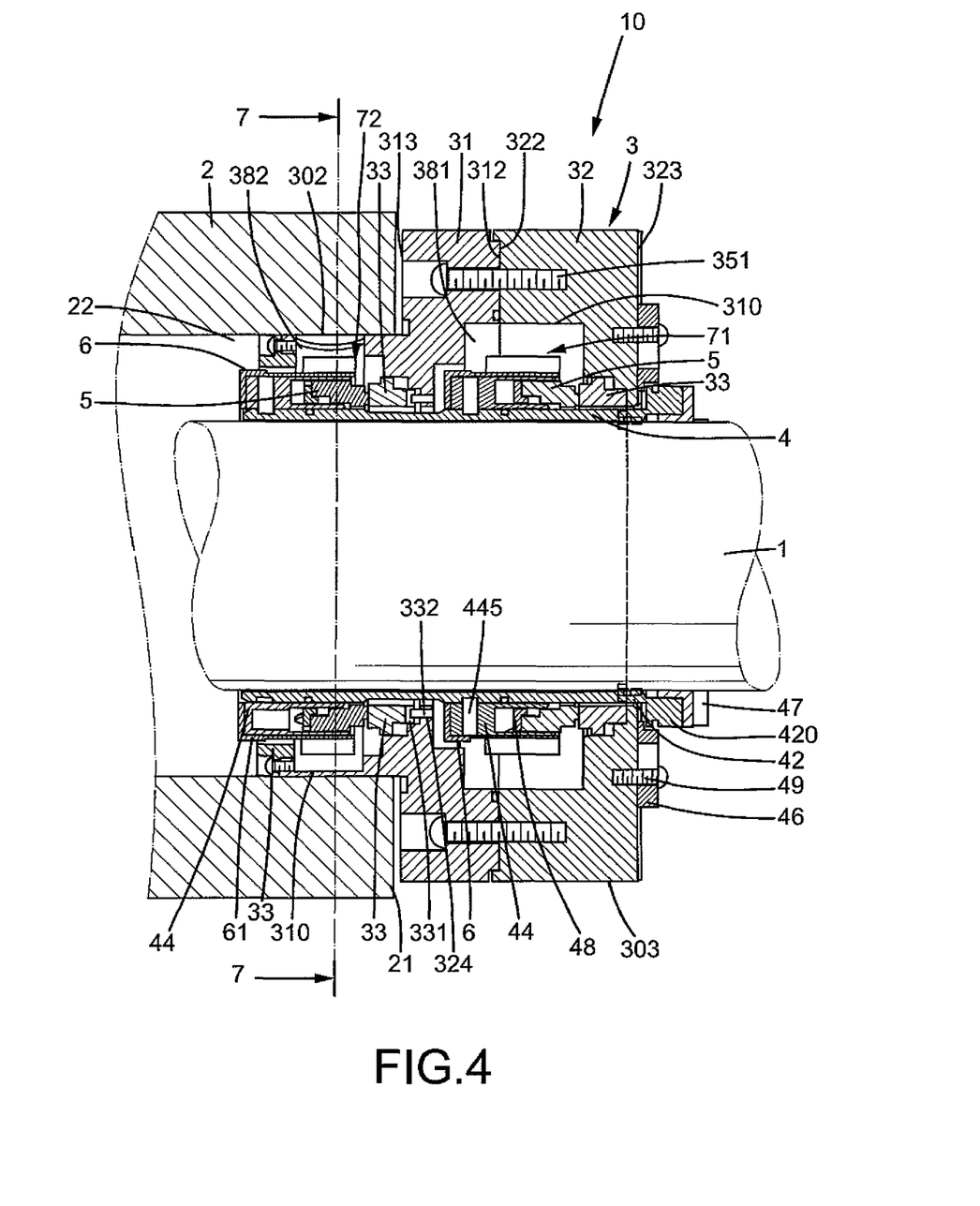
FIG. 4 is a cross sectional view according to section line 4-4 of FIG. 3 with the shaft-sealing device mounted to a pump housing.
Figure 5:
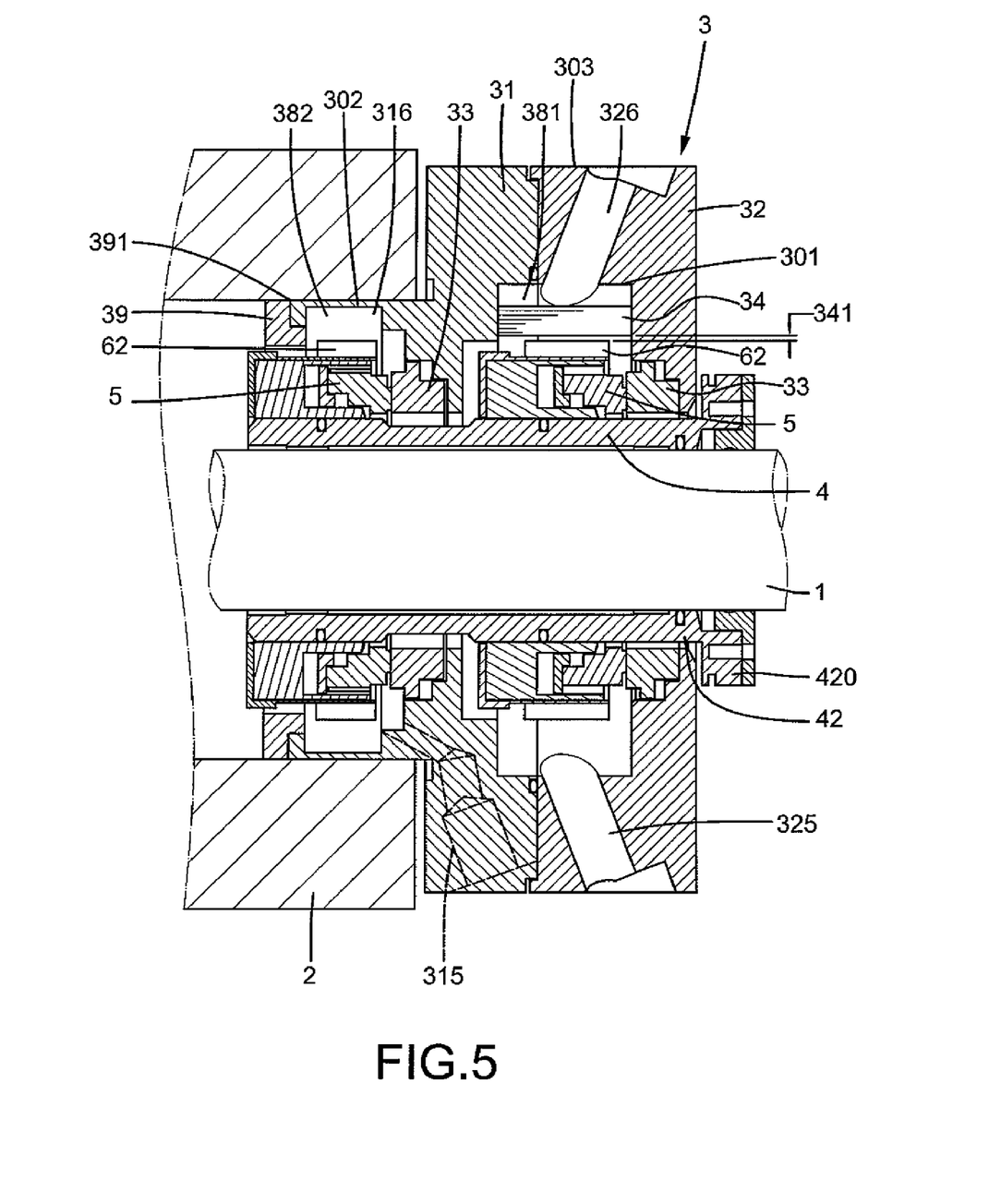
FIG. 5 is a cross sectional view according to section line 5-5 of FIG. 3 with the shaft-sealing device mounted to the pump housing.
Figure 7:
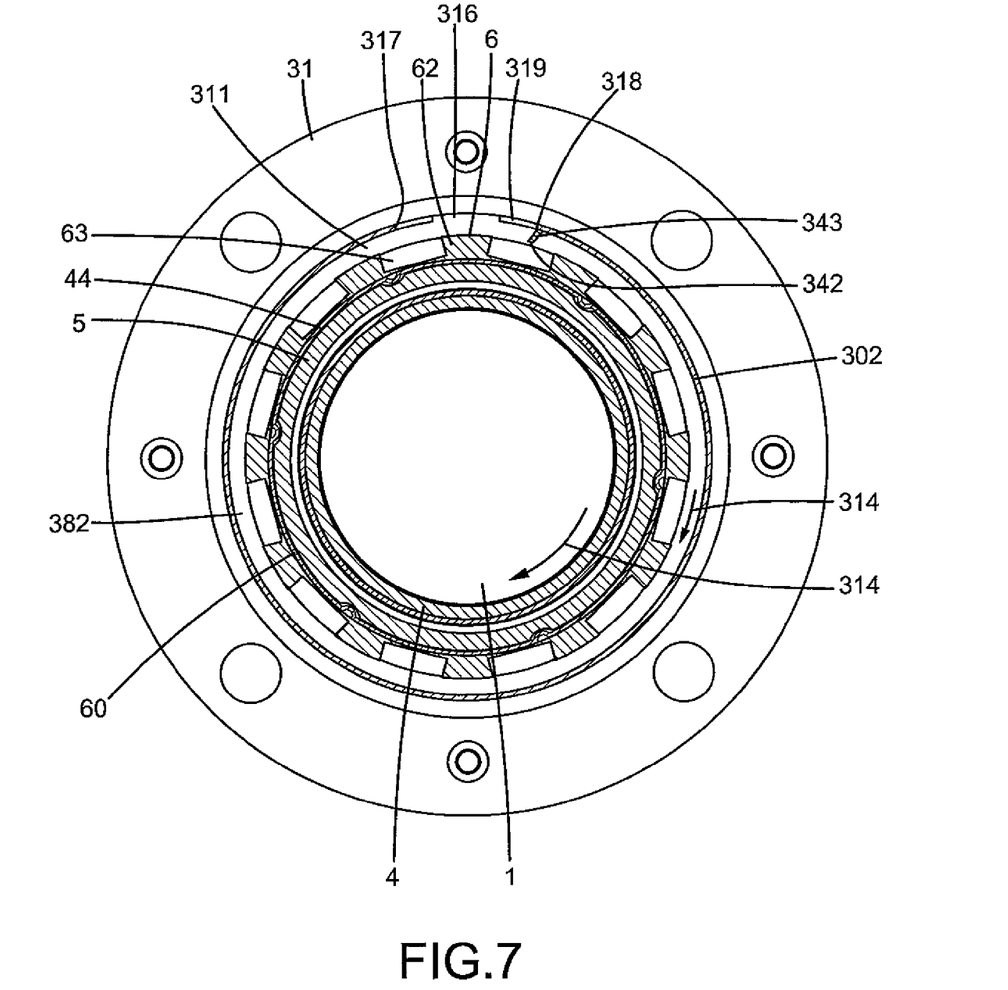
FIG. 7 is a cross sectional view according to section line 7-7 of FIG. 4.

According to the preferred form shown, seal cover 3 includes a cover body 31 and an end cap 32 coupled to an inner end face 312 of cover body 31 by screws 351. An outer end face 313 of cover body 31 is attached to an outer end 21 of pump housing 2 by screws. An annular protrusion 310 projecting perpendicularly from outer end face 313 extends into a pump compartment 22 in pump housing 2 filled with a pump fluid to be sealed. Seal cover 3 further includes a shaft hole 311 extending through cover 31 and end cap 32 along an axis of rotary shaft 1. Shaft hole 311 has a stepped configuration with smaller and larger diameter portions, with the larger diameter portions defining a first, enlarged annular shaft-sealing section 381 and a second, enlarged annular shaft-sealing section 382 spaced from first shaft-sealing section 381 along the axis and adjacent to pump housing 2 (FIG. 4). Furthermore, seal cover 3 includes a coolant inlet 325 through which a coolant is supplied into first shaft-sealing section 381, a coolant outlet 326 extending from an outer periphery 303 of seal cover 3 into first shaft-sealing section 381 and intersecting first shaft-sealing section 381 at a first opening 329 (FIG. 3), a pump fluid inlet 315 through which the pump fluid is supplied into second shaft-sealing section 382 (FIG. 5), and a pump fluid outlet 316 extending from outer periphery 303 of seal cover 3 into second shaft-sealing section 382 and intersecting second shaft-sealing section 382 at a second opening 319 (FIG. 7). First opening 329 includes a circumference having a first side 327 and a second side 328 downstream from first side 327 along a flowing direction of the coolant (as indicated by arrow 314 in FIG. 3) in first shaft-sealing section 381. Second opening 319 includes a circumference having a first side 317 and a second side 318 downstream from first side 317 along a flowing direction of the pump fluid (as indicated by arrow 314 in FIG. 7) in second shaft-sealing section 382. According to the preferred form shown, coolant inlet 325 and outlet 326 are formed in end cap 32, while pump fluid inlet 315 and outlet 316 in annular protrusion 310.

According to the most preferred form shown, shaft-sealing device 10 further includes a shaft sleeve 4, a first shaft-sealing module 71, a second shaft-sealing module 72, a first fender 34, and a second fender 343. Shaft sleeve 4 extends through shaft hole 311 of seal cover 3 and is mounted around rotary shaft 1 to rotate therewith. Shaft sleeve 4 includes a first end 41, a second end 42 and a central portion 43 between first and second ends 41, 42. Second end 42 is provided with a flange 420 extending around an outer periphery thereof and having a plurality of positioning holes 421 for engaging with a positioning ring 47. Positioning ring 47 is engaged with rotary shaft 1 by fasteners such as screws to joint shaft sleeve 4 and rotary shaft 1 together. A plurality of positioning plates 46 are sandwiched between an outer end face 323 of end cap 32 and an end face of flange 420 such that the mounting positions of shaft sleeve 4 relative to seat cover 3 along the axis can be adjusted by altering thickness of positioning plates 46.

According to the most preferred form shown, first shaft-sealing module 71 is mounted in first shaft-sealing section 381 for sealing between seal cover 3 and rotary shaft 1 and includes a first stationary ring 33, a first rotary ring 5, a first spring holder 44 and a first pumping ring 6. Second shaft-sealing module 72 is mounted in second shaft-sealing section 382 for sealing between pump housing 2 and rotary shaft 1 and includes a second stationary ring 33, a second rotary ring 5, a second spring holder 44 and a second pumping ring 6. Each of first and second stationary rings 33 is mounted around shaft sleeve 4 and secured in one of shaft-sealing sections 381, 382 by two pins 332 each of which fits into a notch 331 in an associated stationary ring 33 and an associated cavity 324 in seal cover 3 (FIG. 4). Each stationary ring 33 is made of wear-resisting carbide and includes a stationary, sealing end face 333. Each rotary ring 5 is made of wear-resisting carbide and moveably mounted around shaft sleeve 4 in one of shaft-sealing section 381, 382. Each rotary ring 5 includes a moveable, sealing end face 52 facing stationary, sealing end face 333 of an associated stationary ring 33 and is biased toward the associated stationary ring 33 for elastic contact of two sealing end faces 333, 52 to form a moveable sealing interface.

According to the most preferred form shown, first and second spring holders 44 are securely mounted around central portion 43 and first end 41 of shaft sleeve 4 respectively by engaging pins 445 each of which is inserted into a through-hole 443 in an associated spring holders 44 and an associated positioning hole 446 in shaft sleeve 4. Each spring holder 44 has an annular groove 444 in an inner end face 442 thereof. A plurality of springs 45, a washer 48 and one of rotary rings 5 are received in annular groove 444 of each spring holder 44 in order, with a plurality of cutaway portions 481 in an outer circumference of washer 48 and cutaway portions 51 in an outer circumference of rotary ring 5 being engaged with protrusions 447 on an annular wall of annular groove 444. Each washer 48 is biased by springs 45 to press against one of rotary rings 5 into sealing engagement with an associated stationary ring 33.

Figure 6:
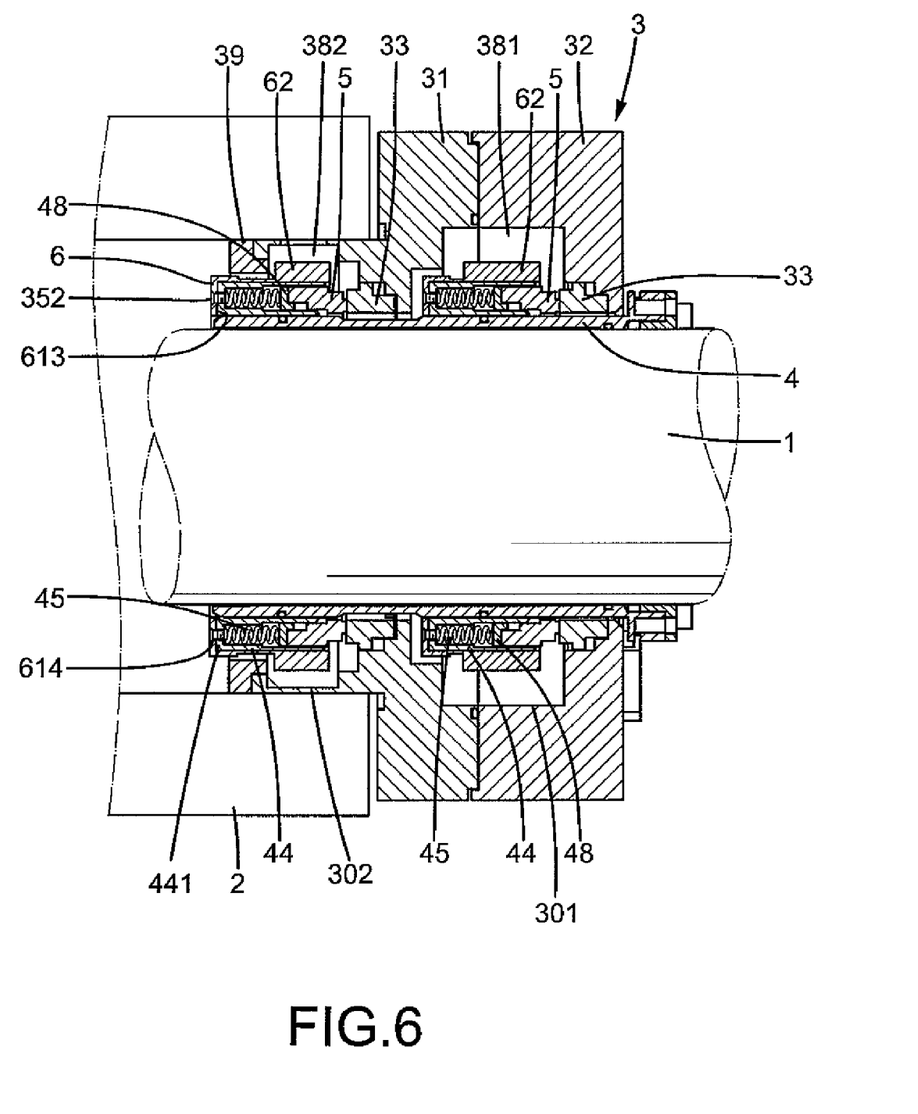
FIG. 6 is a cross sectional view according to section line 6-6 of FIG. 3 with the shaft-sealing device mounted to the pump housing.

According to the most preferred form shown, first pumping ring 6 is mounted in first shaft-sealing section 381 and securely mounted around central portion 43 of shaft sleeve 4 to rotate therewith, and second pumping ring 6 is mounted in second shaft-sealing section 382 and securely mounted around first end 41 of shaft sleeve 4 to rotate therewith. Each pumping ring 6 is made of copper and includes an outer circumference 60 having a plurality of protrusions 62 annularly spaced from one another and extending along the axis. Each pumping ring 6 further includes an annular hole 61 and a first end 611 having a flange 613 extending inwardly around a periphery thereof. Each spring holder 44 is securely received in annular hole 61 of one of pumping rings 6 by screws 352 respectively extending through holes 614 in flange 613 into an outer end face 441 of an associated spring holder 44 (FIG. 6). After mounting second pumping ring 6 in second shaft-sealing section 382 and around shaft sleeve 4, a positioning ring 39 is locked on an outer end 391 of annular protrusion 310 of cover body 31.

Figure 1:
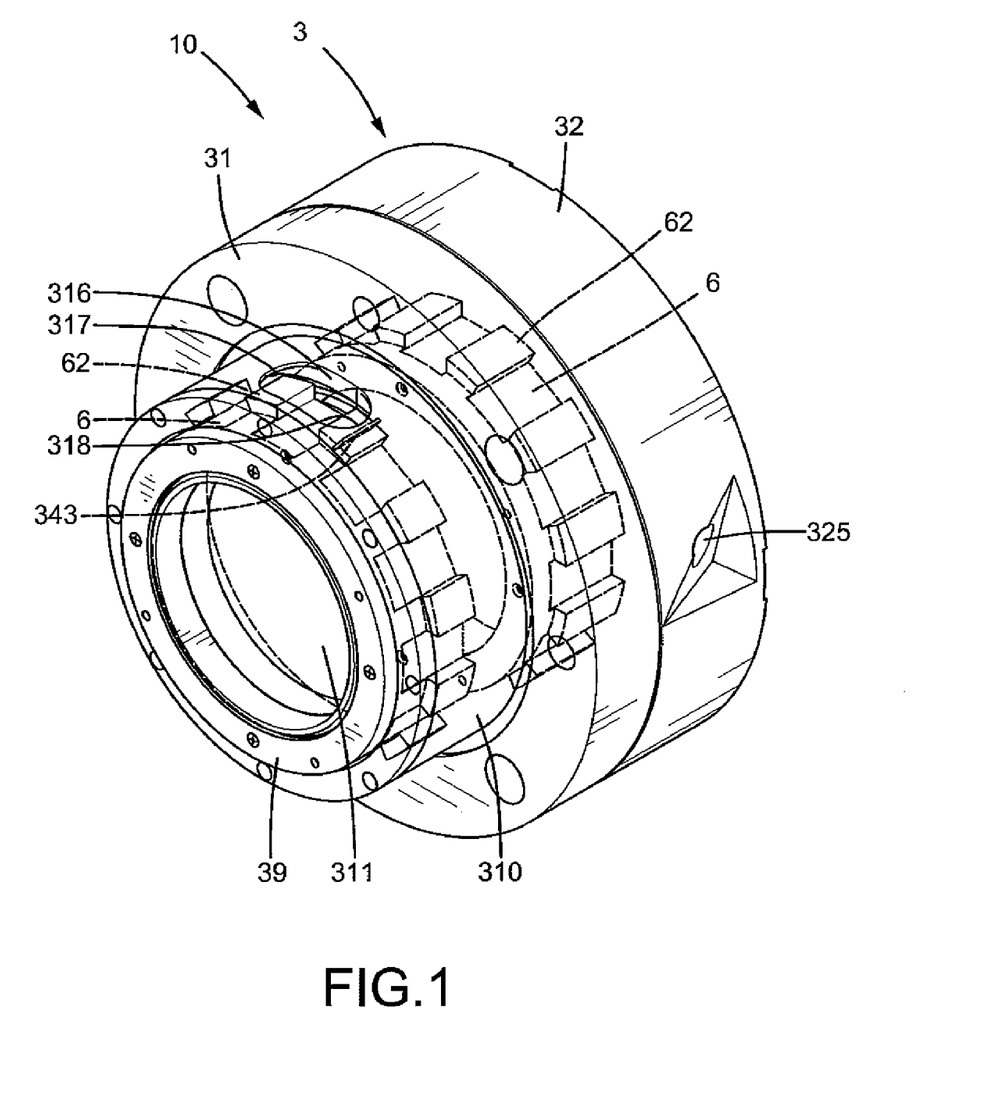
FIG. 1 is a perspective view of a shaft-sealing device of an embodiment according to the preferred teachings of the present invention.
Figure 2:
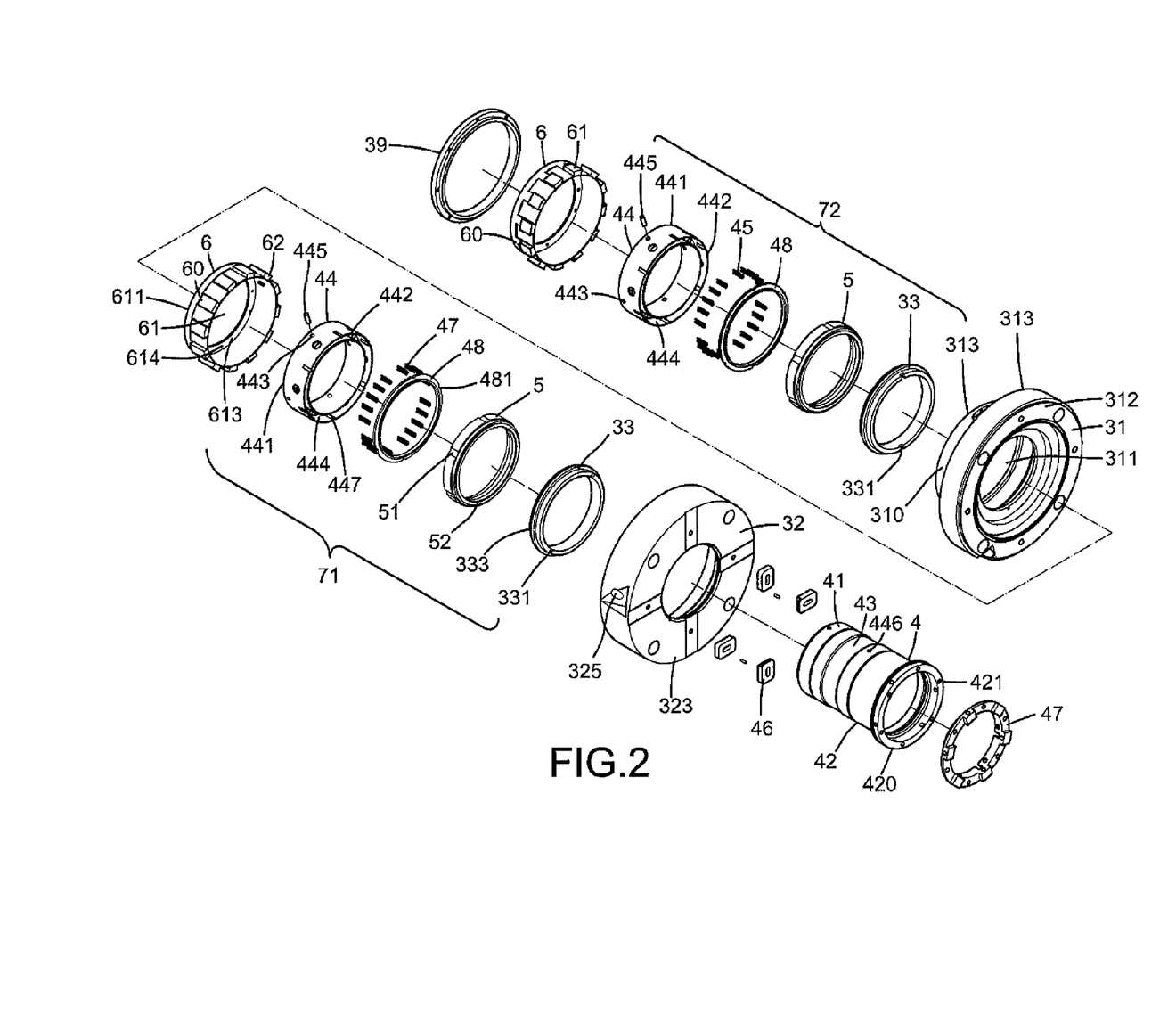
FIG. 2 is an exploded, perspective view of the shaft-sealing device of FIG. 1.
Figure 3:
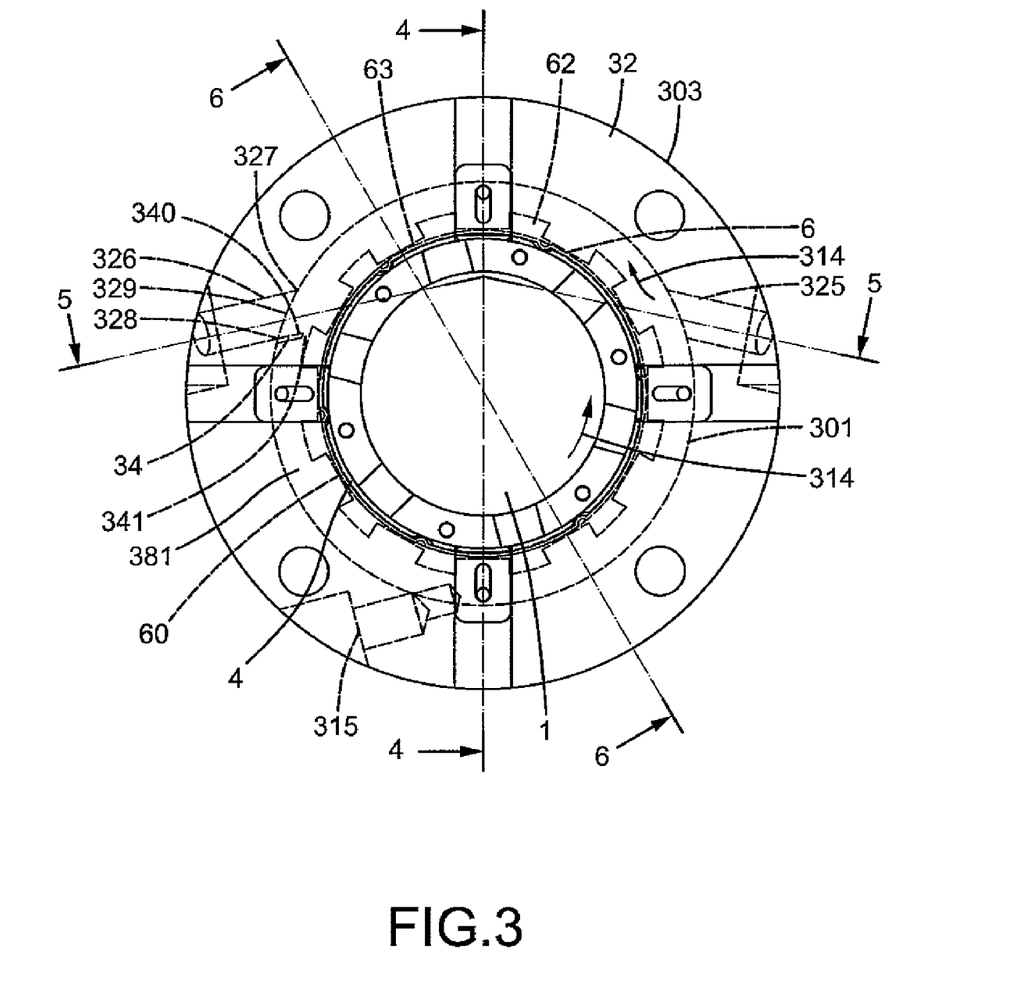
FIG. 3 is a side view of the shaft-sealing device of FIG. 1.

According to the most preferred form shown, first fender 34 projects from second side 328 of the circumference delimiting first opening 329 into first shaft-sealing section 381 and is spaced from shaft sleeve 4 (FIG. 3). A gap 341 is formed between first fender 34 and first pumping ring 6 in a radial direction perpendicular to the axis. According to the preferred form shown, first fender 34 is a substantially quadrangular plate including a side face 340 facing first opening 329 and at an acute angle with the circumference delimiting first opening 329 of coolant outlet 326. Also, second fender 343 projects from second side 318 of the circumference delimiting second opening 319 into second shaft-sealing section 382 and is spaced from shaft sleeve 4 (FIG. 7). A gap 342 is formed between second fender 343 and second pumping ring 6 in the radial direction. Second fender 343 is a substantially quadrangular plate including a side face 340 facing second opening 319 and at an acute angle with the circumference delimiting second opening 319 of pump fluid outlet 316.

In operation of shaft-sealing device 10, shaft sleeve 4, rotary rings 5, spring holders 44 and pumping rings 6 will rotate jointly with rotary shaft 1, and each rotary ring 5 elastically contacts an associated stationary ring 33 to maintain the sealing between pump housing 2 and rotary shaft 1. A coolant fed into first shaft-sealing section 381 through coolant inlet 325 flows therein, and a pump fluid fed into second shaft-sealing section 382 through pump fluid inlet 315 also flows therein according to a rotation direction of rotary shaft 1 (see arrow 314 in FIGS. 3 and 7). The coolant encounters side face 340 of first fender 34 when flowing through first opening 329 of coolant outlet 326 and is guided into coolant outlet 326 to discharge through first opening 329 smoothly. Also, the pump fluid encounters side face 340 of second fender 343 when flowing through second opening 319 of pump fluid outlet 316 and is guided into pump fluid outlet 316 to discharge through second opening 319 smoothly. Further, the coolant flowing in first shaft-sealing section 381 and the pump fluid flowing in second shaft-sealing section 382 is stirred and further driven by protrusions 62 during rotation of pumping rings 6 such that the flowing velocity of circulating coolant currents and pump fluid currents will be increased. Moreover, pumping rings 6 are made of copper such that the outer circumference of each pumping ring 6 provided with protrusions 62 can be disposed close to an inner wall of pump housing 2 for a greater stirring area, as there is no cause of flare or electric potential difference even though pumping rings 6 contact the inner wall of pump housing 2 due to accidents such as shock. Furthermore, gaps 341, 342 can be easily changed through altering extending height of fenders 34, 343 and/or protrusions 62 of pumping rings to adjust the discharge heads of both of the coolant in first shaft-sealing section 381 and the pump fluid in second shaft-sealing section 382, thereby further increasing the circulating effect of the coolant and pump fluid currents.

In some applications only one shaft-sealing module, such as first shaft-sealing module 71, can be utilized.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A shaft-sealing device comprising, in combination:
a seal cover adapted to be attached to a pump housing in which a rotary shaft is mounted, with the seal cover including a shaft hole extending along an axis of the rotary shaft, with the shaft hole including a first, enlarged shaft-sealing section having a diameter greater than that of the shaft hole, with the seal cover further including a coolant inlet through which a coolant is supplied into the first shaft-sealing section, with the seal cover further including a coolant outlet extending from an outer periphery of the seal cover into the first shaft-sealing section and intersecting the first shaft-sealing section at a first opening, with the first opening being delimited by a circumference having a first side and a second side downstream from the first side along a flowing direction of the coolant in the first shaft-sealing section;
a shaft sleeve extending through the shaft hole of the seal cover and adapted to be mounted around the rotary shaft to rotate therewith, with a first stationary ring being mounted around the shaft sleeve and secured in the first shaft-sealing section, and with a first rotary ring being moveably mounted around the shaft sleeve and biased toward the first stationary ring to provide sealing engagement therebetween;
a first fender projecting from the second side of the circumference delimiting the first opening into the first shaft-sealing section and spaced from the shaft sleeve, with the first fender having a side face facing the first opening, with the side face of the first fender guiding the coolant into the coolant outlet through the first opening when the coolant fed into the first shaft-sealing section flows through the first opening of the coolant outlet and encounters the side face of the first fender; and
a first pumping ring mounted in the first shaft-sealing section and securely mounted around the shaft sleeve to rotate therewith, with the first pumping ring including an outer circumference having a plurality of protrusions annularly spaced from one another and extending along the axis to assist in driving the coolant in the first shaft-sealing section, with a gap formed between the first pumping ring and the first fender in a radial direction perpendicular to the axis,
with the first pumping ring being made of copper, with the first fender being a substantially quadrangular plate, and with the side face of the first fender being at an acute angle with the circumference delimiting the first opening of the coolant outlet.

2. The shaft-sealing device as claimed in claim 1, further comprising, in combination: a spring holder received in the first pumping ring and securely mounted around the shaft sleeve to rotate therewith, with the spring holder having an annular groove in an end face thereof, with a plurality of springs and a washer received in the annular groove, and with the washer being biased by the plurality of springs and pressing against the first rotary ring to urge the first rotary ring into sealing engagement with the first stationary ring.

3. The shaft-sealing device as claimed in claim 2, with the shaft hole further including a second, enlarged shaft-sealing section having a diameter greater than that of the shaft hole and spaced from the first shaft-sealing section along the axis, with the seal cover further including a pump fluid inlet through which a pump fluid is supplied into the second shaft-sealing section, with the seal cover further including a pump fluid outlet extending from the outer periphery of the seal cover into the second shaft-sealing section and intersecting the second shaft-sealing section at a second opening, with the second opening being delimited by a circumference having a first side and a second side downstream from the first side along a flowing direction of the pump fluid in the second shaft-sealing section, and with the shaft-sealing device further including a second fender projecting from the second side of the circumference delimiting the second opening into the second shaft-sealing section and spaced from the shaft sleeve, with the second fender having a side face facing the second opening, and with the side face of the second fender guiding the pump fluid into the pump fluid outlet through the second opening when the pump fluid fed into the second shaft-sealing section flows through the second opening of the pump fluid outlet and encounters the side face of the second fender.

4. The shaft-sealing device as claimed in claim 3, with a second stationary ring being secured in the second shaft-sealing section and mounted around the shaft sleeve, and with a second rotary ring being moveably mounted around the shaft sleeve and biased toward the second stationary ring to provide sealing engagement therebetween.

5. The shaft-sealing device as claimed in claim 4, further comprising, in combination: a second pumping ring mounted in the second shaft-sealing section and securely mounted around the shaft sleeve to rotate therewith, with the second pumping ring including an outer circumference having a plurality of protrusions annularly spaced from one another and extending along the axis to assist in driving the pump fluid in the second shaft-sealing section, and with a gap formed between the second pumping ring and the second fender in the radial direction.

6. The shaft-sealing device as claimed in claim 5, with the second pumping ring being made of copper, with the second fender being a substantially quadrangular plate, and with the side face of the second fender being at an acute angle with the circumference delimiting the second opening of the pump fluid outlet.

7. The shaft-sealing device as claimed in claim 6, further comprising, in combination: a second spring holder received in the second pumping ring and mounted around the shaft sleeve to rotate therewith, with the second spring holder having an annular groove in an end face thereof, with a plurality of springs and a washer received in the annular groove, and with the washer being biased by the plurality of springs and pressing against the second rotary ring to urge the second rotary ring into sealing engagement with the second stationary ring.

\* \* \* \* \*